United States Patent [19]

Sirokorad et al.

[11] 4,446,741

[45] May 8, 1984

[54] VIBRATION TRANSDUCER

[75] Inventors: Jurij Sirokorad; Jiri Vecera, both of Brno, Czechoslovakia

[73] Assignee: Prvni brnenska strojirna, narodni podnik, Brno, Czechoslovakia

[21] Appl. No.: 268,697

[22] Filed: Jun. 1, 1981

[51] Int. Cl.³ .............................................. G01H 11/00
[52] U.S. Cl. ........................................ 73/654; 336/134
[58] Field of Search ...................... 336/110, 132, 134; 73/652, 517 R, 517 AV, 654, 658, 617 R, 517 AA; 324/207, 208

[56] References Cited

U.S. PATENT DOCUMENTS

| | | | |
|---|---|---|---|
| 2,852,243 | 9/1958 | Shepard, Sr. | 73/517 R |
| 3,100,292 | 8/1963 | Warner, Jr. et al. | 73/517 R |
| 3,129,347 | 4/1964 | Tognola | 73/517 R |
| 3,308,647 | 3/1967 | Crawford | 73/654 X |
| 3,483,759 | 12/1969 | Venetos et al. | 73/517 R |

*Primary Examiner*—Stephen A. Kreitman

[57] ABSTRACT

A vibration transducer for measuring vibrations and shocks, especially vibrations which occur during the operation of machines and mechanical equipment. The induction vibration transducer comprises a permanent magnet movably mounted with respect to at least one induction coil. The movable magnet is provided in the axial cavity of a bushing having disc-like permanent magnets at its opposite ends, the movable magnet being repelled by the fixed permanent magnets. Around the bushing between the axially inner pole pieces of the fixed permanent magnets and the ends of the movable permanent magnet there are pseudobifilar wound induction coils. One or both of the confronting surfaces of the bushing and the movable permanent magnet is provided with an anti-friction covering or coating. The vibration transducer of the invention has relatively small dimensions, withstands moderately high temperature, and is virtually unaffected by temperature changes.

4 Claims, 4 Drawing Figures

VIBRATION TRANSDUCER

This application is related to application Ser. No. 269,274 of Sirokorad et al, filed concurrently herewith.

This invention relates to a vibration transducer for measuring vibrations and shocks, especially vibrations generated during the function of machines and mechanical equipment.

Vibrations are one of the important parameters characterizing the working conditions and operating mode of a machine. It is of the utmost importance to measure and evaluate vibrations, particularly of high-speed rotating machines and of equipment working for long periods, such as steam and gas turbines.

When working with the above-mentioned equipment and apparatus, vibration transducers are very often exposed to high temperatures, to high accelerations, and to high vibration amplitudes which attain in certain phases of the operating mode the value of even several hundred micrometers, whereas in the usual operation of such equipment, the vibration amplitude value may be only a few micrometers. Besides that, the vibration transducer should have small dimensions and weight, a linear characteristic within the whole measuring range, and should be resistant to electromagnetic interference.

There are in current use induction vibration transducers wherein a permanent magnet is suspended in an elastic membrane between two rigidly fixed coils. When the transducer moves, there is induced in said coils an electromotive force which is amplified and measured by suitable equipment. Such induction transducers have the disadvantage that under rigorous conditions, especially when the vibration amplitude is greatly increased, their membranes crack.

Another known induction vibration transducer consists of a transducing coil and of two magnetic rings. The inner movable magnetic ring is mounted with clearance in the cylindrical cavity of the outer rigid magnetic ring. In the narrow inter-cylindrical space between the two magnetic rings, there is arranged a thin transducing coil in a guide sleeve or bushing. The oscillation of the inner movable magnetic ring induces an electromotive force in the transducing coil, such electromotive force being amplified and measured in a suitable way. The disadvantage of this type of vibration transducer is that it produces a relatively weak signal, and also an imperfect guiding of the inner movable magnetic ring within the outer rigid magnetic ring, such guiding giving rise to an increased friction during the operation and counter-running of the mutually moving parts. There is thereby developed, particularly in small vibration amplitudes, a considerable non-linearity as regards the induced electromotive force with relation to the relative speed of the magnetic rings. For these reasons, the use of this induction transducer is restricted to measuring only in the vertical direction.

Another known induction transducer has in a guide profile above a rigidly mounted solid magnet a concentrically arranged thin disc transducing coil, above which coil there is arranged an axially movable magnet. Owing to the oppositely polarized magnets, there are formed in their common front space axial repulsive forces, which forces function as a pushing elastic element which holds the movable magnet in a permanent suspension above the fixed magnet. This type of induction transducer also makes it possible to measure vibrations only in the vertical direction.

There is also known an induction vibration transducer formed by a movable permanent magnet mounted in a bushing or sleeve and bilaterally fixed by two springs. Around the bushing there is arranged an induction coil. When the movable magnet moves, there is induced an electromotive force in the coil, such force being amplified, measured and evaluated in a suitable way. However, this type of transducer has a lower sensitivity, owing to the friction in the bushing and owing to the twisting moment transmitted through the springs to the permanent magnet and pushing the same toward the walls of the bushing. Besides that, the mass and the proper characteristic frequency of the springs restrict the use of these transducers to a relatively small range of frequency and acceleration. Likewise, it is very difficult and costly to make springs with a precise frequency characteristic and precise dimensions.

For measuring vibrations, particularly in the above-described type of equipment and apparatus, there are used piezoelectric vibration transducers. In such piezoelectric transducers there is made use of the capacity of some crystals to transduce or transform mechanical forces to electrical voltages proportional to the mass acceleration of the piezoelectric transducer which occurs during the vibration. This voltage is amplified, measured and evaluated with suitable equipment. The advantage of piezoelectric transducers is their capacity to withstand high accelerations and vibration amplitudes, and also their small dimensions. However, they give weak signals. Therefore, the respective amplifying equipment has to be disposed a relatively small distance from the piezoelectric transducer. Besides that, piezoelectric transducers are very sensitive to ambient temperature variation which they encounter.

The present invention has among its objects the elimination of the majority of the above-described disadvantages of the known vibration transducers. According to the invention, the induction vibration transducer for measuring vibrations and shocks according to the invention comprises a permanent magnet movably mounted with respect to at least one induction coil. In the embodiments shown, there is provided a sleeve or bushing having disc-shaped permanent magnets spanning its opposite ends, the confronting ends or poles of the permanent magnets being of opposite polarity. A ring-like permanent magnet is mounted for reciprocation in the space within the sleeve between the fixed permanent magnets, the movable permanent magnets having poles of the same polarity as the poles of the permanent magnets which they confront. Induction coils are wound about the outside of the sleeve at transverse zones aligned with the respective spaces between the poles of the movable magnet and poles of the fixed magnets. At least one of the confronting inner surface of the sleeve and the outer surface of the movable magnet is provided with an anti-friction coating.

The induction vibration transducer according to the invention has relatively small dimensions, and withstands considerable acceleration and amplitudes of vibration. It also withstands variable ambient temperatures, and produces a relatively strong output signal, thus making it possible to locate the amplifying and measuring equipment at a greater distance from the transducer than was formerly possible. Its sensitivity is very good; it has a linear relationship between the electromotive output and its speed of vibration, and it withstands temperatures up to 250° C. without damage.

The invention will be more readily understood upon reference to the accompanying drawings, in which.

Figure 1:
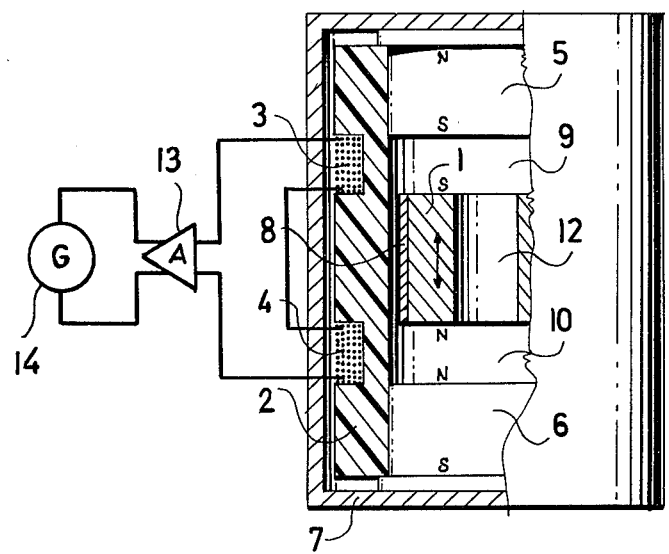
FIG. 1 is a view in axial section of a first disclosed embodiment of the transducer of the invention.
Figure 2:
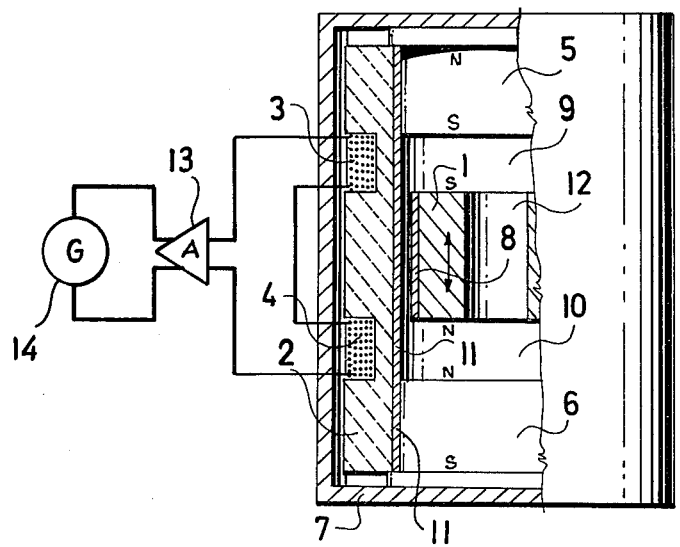
FIG. 2 is a similar view of a second embodiment of the transducer of the invention.

As shown in FIG. 1, the first embodiment of induction vibration transducer in accordance with the invention has a closed housing 7 of circular cylindrical form, housing 7 being preferably made of ferromagnetic material so as to shield the transducer from ambient magnetic fields. Within the cavity in the housing 7 there is fixed a bushing or sleeve 2 made of non-magnetic, electrically non-conducting material. Permanent magnets 5 and 6, respectively, span the upper and lower ends of the sleeve 2. Each of magnets 5 and 6 has an upper north pole and a lower south pole. Between the magnets 5 and 6 there is disposed a concentrically positioned axially movable cylindrical permanent magnet 1 of annular shape, the upper end of magnet 1 being a south pole and the lower end of magnet 1 being a north pole. Because of the confronting poles of opposite polarity of magnet 5 and magnet 1 on the one hand, and magnet 6 and magnet 1 on the other hand, the axially movable magnet 1 when at rest seeks a position such as shown in FIGS. 1 and 2 wherein at least substantially equal spaces 9 and 10 exist between the opposite ends of the magnet 1 and the respective magnets 5 and 6.

The magnetic fields in the spaces 9 and 10 function as pushing elastic elements with very advantageous characteristics. The said repulsive forces of the magnetic fields acting in the poles spaces 9 and 10 at any time prevent the direct contact in any stationary position of the induction vibration transducer between the permanent movable magnet 1 and either of the fixed permanent magnets 5 and 6. The permanent magnet 1 is in the form of a short tube, that is, it has a central opening therethrough which provides for the free exchange of gas from space 9 to space 10 and vice versa, thereby preventing any appreciable damping of the movement of magnet 1 by the gas within the transducer.

The movable permanent magnet 1 is provided with an anti-friction coating 8, such as tetrafluoroethylene (Teflon). This, plus the fact that the material of which the sleeve 2 is made is chosen with regard to the minimal mutual friction factor with coating 8, also minimizes any damping of the axial movement of the magnet 1.

In the peripheral outer cylindrical surface of the sleeve 2 there are provided two peripheral recesses wherein there are arranged pseudobifilar induction coils 3 and 4. The coil windings in the bifilar arrangement consist of two coil conductor warps arranged in each coil space, such coil warps being made up of two conductors of an approximately equal length. The conductor of one warp is wound in counter direction with respect to the conductor of the second warp. Both conductors are wound alternatively in the immediate vicinity of each other, being mutually conductively connected in the middle of the total length of the said coil winding. The purpose of this bifilar arrangement of the coil winding is to compensate mutually the magnetic fields formed during the passage of electric current through both coil conductor warps.

In accordance with this invention, the concept of the "pseudobifilar arrangement of the coil winding" means the arrangement of both coil conductor warps into two independent coil spaces. In the embodiment shown, the first coil conductor warp of the first induction coil 4 is axially offset toward the second coil conductor warp of the second induction coil 3. In such a pseudobifilar arrangement the magnetic fields formed during the passage of electric current through both conductor warps are compensated only partially. On the other hand, the said pseudobifilar arrangement makes it possible to increase the total electromotive force induced during the given axial movement of the permanent magnet 1 within the sleeve 2. Further, such arrangement weakens the interference influence, if any, of any external magnetic fields to which the transducer may be subjected. This weakening effect is also assisted by making the body 7 of ferromagnetic material, thereby shielding the interior of the transistor.

In the second embodiment of the transducer, shown in FIG. 2, the sleeve 2 is made of ceramic material and is provided on its inner surface with a tubular anti-friction insert 11 made of tetrafluoroethylene. This guarantees the dimensional stability of the sleeve 2 even during relatively large temperature changes. Otherwise, the second embodiment shown in FIG. 2 is the same as that shown in FIG. 1, and similar parts are designated by the same reference characters.

Figure 3:
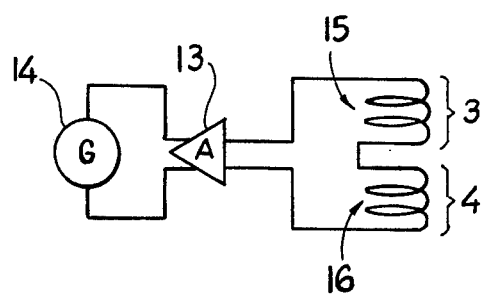
FIG. 3 is a diagram of a first embodiment of a circuit of the transducer of the invention.

FIG. 3 shows a first wiring arrangement employed in connection with the transducer of the invention. There the two coils 3 and 4 are made up of coil warps 15 and 16, respectively. The upper terminal of coil 3 is connected to a first input terminal of an amplifier 13, the lower terminal of the coil 3 is connected to the upper terminal of the coil 4, and the lower terminal of coil 4 is connected to the other input terminal of the amplifier 13. The output terminals of the amplifier 13 are connected to a measuring instrument 14, which is in the form of a galvanometer.

Figure 4:
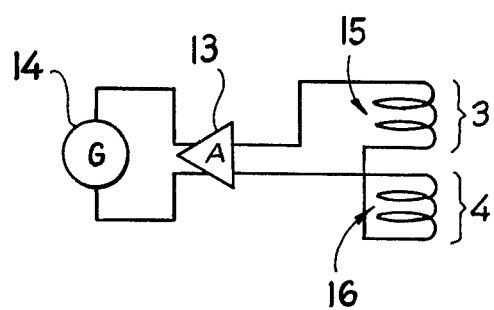
FIG. 4 is a view similar to FIG. 3 showing a second embodiment of the circuit of the transducer of the invention.

In FIG. 4 there is shown an alternative wiring arrangement for employment with the embodiments of transducers shown in either FIG. 1 or FIG. 2. The wiring diagram of FIG. 4 differs from that of FIG. 3 only in that in FIG. 4 the lower terminal of coil 3 is connected to the lower terminal of coil 4, and the upper terminals of coils 3 and 4 are connected to the respective input terminals of the amplifier 13.

After the induction vibration transducer of the invention has been affixed to a vibrating object, such as the bearing pedestal of a turbine, the permanent magnet 1 starts moving in an axial directon with respect to the other parts of the transducer, i.e. axially of the sleeve 2 and reciprocatory with respect to the fixed permanent magnets 5 and 6 and induction coils 3 and 4. During this movement, the lines of force of the permanent magnet 1 intersect the winding of the induction coils 3 and 4 so as to induce a resultant, electromotive force therein. Such electromotive force is then amplified and measured suitable equipment as above described and illustrated. With the described pseudobifilar arrangement of the induction coils 3 and 4, this resultant electromotive force is the sum of the partial electromotive forces formed separately in the first induction coil 3 and in the second induction coil 4, thus being of a maximum value.

Although the invention is illustrated and described with reference to a plurality of preferred embodiments thereof, it is to be expressly understood that it is in no way limited to the disclosure of such preferred embodiments but is capable of numerous modifications within the scope of the appended claims.

We claim:

1. An induction vibration transducer for measuring vibrations and shocks, comprising an elongated sleeve, an induction coil wound about the exterior of the sleeve, a first permanent magnet movably mounted within the sleeve for movement axially thereof, and second and third permanent magnets mounted on the sleeve in axially spaced positions thereon so as to provide free spaces between the inner pole pieces thereof and the confronting poles of the movable permanent magnet, the pole of the second and third fixed permanent magnets confronting poles of the same polarity on the first movable permanent magnet, the induction coil being composed of pseudobifiliary wound induction coils disposed on the outer surface of the sleeve at the location of the interpolar spaces between the respective second and third, fixed permanent magnets and the first movable permanent magnet, the first, movable permanent magnet having a central opening therethrough which provides for the free exchange of gas between the spaces within the sleeve at the opposite ends of the first, movable permanent magnet.

2. An induction vibration transducer according to claim 1, wherein at least one of the confronting inner surface of the sleeve and the outer surface of the fixed permanent magnet is coated with anti-friction material.

3. An induction vibration transducer according to claim 2, wherein the movable permanent magnet is provided with an external coating of anti-friction material.

4. An induction vibration transducer according to claim 2, wherein both of said confronting surfaces are provided with anti-friction coatings.